United States Patent [19]

Inoue

[11] Patent Number: 5,189,652
[45] Date of Patent: Feb. 23, 1993

[54] MULTI-DISC RECORDING AND REPRODUCING APPARATUS HAVING DETACHABLE OPTICAL HEAD UNITS

[75] Inventor: Kazuhiko Inoue, Kawasaki, Japan

[73] Assignee: Fujitsu Limited, Kawasaki, Japan

[21] Appl. No.: 665,835

[22] Filed: Mar. 7, 1991

[30] Foreign Application Priority Data

Mar. 8, 1990 [JP] Japan ................................ 2-54895

[51] Int. Cl.⁵ ............................ G11B 7/08; G11B 7/12
[52] U.S. Cl. .................................. 369/36; 369/44.14; 369/198; 369/199; 369/215
[58] Field of Search ............... 369/215, 219, 220, 195, 369/199, 44.14, 34, 36, 75.1, 198, 197; 360/98.01, 98.02, 98.03, 98.04, 99.09, 99.11, 104, 109

[56] References Cited

U.S. PATENT DOCUMENTS

| | | | |
|---|---|---|---|
| 4,330,806 | 5/1982 | Iwabuchi et al. | 360/97.01 X |
| 4,387,452 | 6/1983 | Bricot et al. | 369/199 X |
| 4,740,946 | 4/1988 | Yumura et al. | 369/219 |
| 4,797,866 | 1/1989 | Yoshikawa | 369/44.14 |

FOREIGN PATENT DOCUMENTS 1-296476  11/1989  Japan ................................ 360/98.01

Primary Examiner—John W. Shepperd
Assistant Examiner—Edward H. Sikorski
Attorney, Agent, or Firm—Nikaido, Marmelstein, Murray & Oram

[57] ABSTRACT

A stationary type optical disc apparatus which includes a housing, a plurality of disc media contained in the housing and arranged in parallel to each other, a plurality of head units detachably inserted into the housing along rails formed in parallel to the disc surfaces, and a head movably mounted on the head unit so that the head is able to access a predetermined position on the disc media.

17 Claims, 7 Drawing Sheets

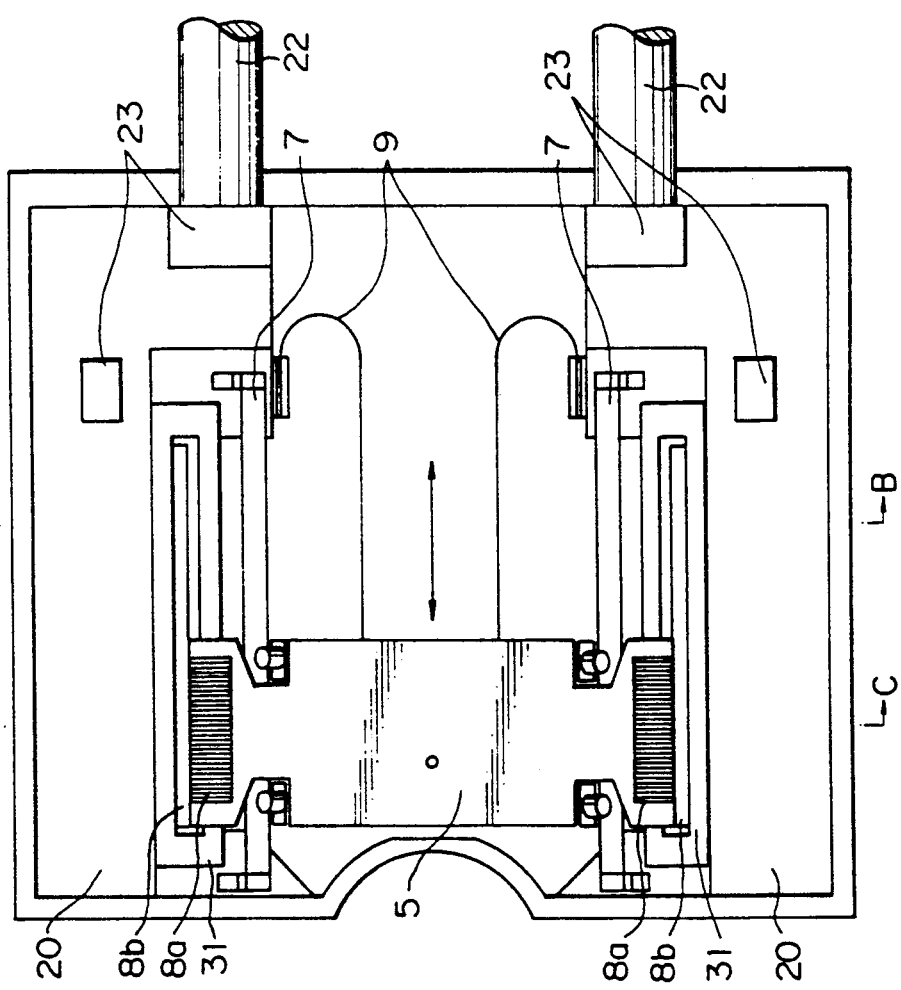
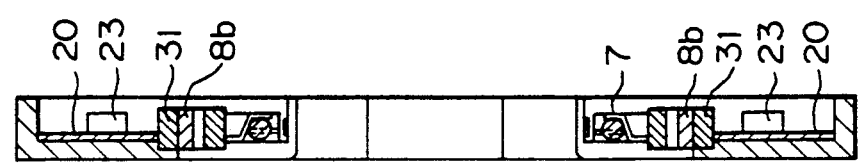
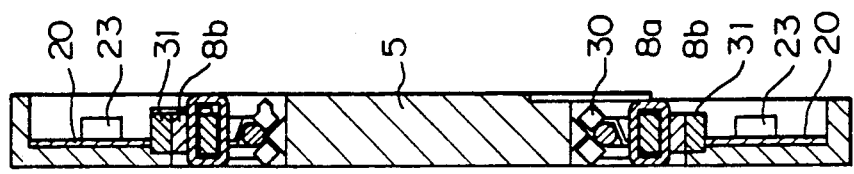

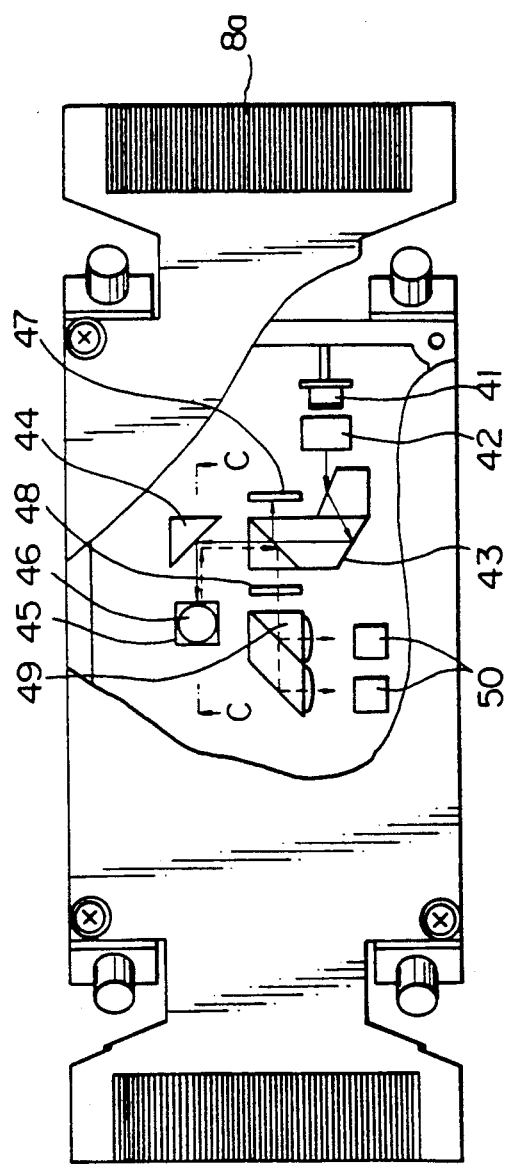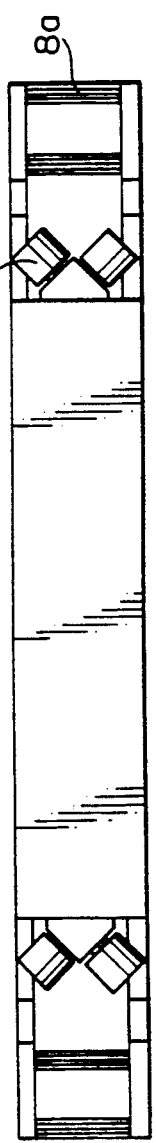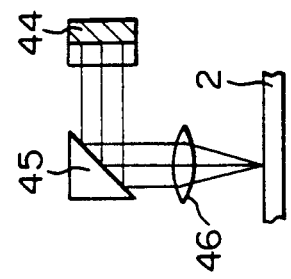
Fig. 6A
Fig. 6B
Fig. 6C

MULTI-DISC RECORDING AND REPRODUCING APPARATUS HAVING DETACHABLE OPTICAL HEAD UNITS

BACKGROUND OF THE INVENTION

1. Field of the Invention

This invention relates to a disc apparatus used as an external recording, reading, and memory means in a computer system, a word processor, or the like.

In such a disc apparatus, the access time required for a disc head to access a predetermined track of the disc media must be reduced, and further, it must possible to easily and rapidly replace, change, or repair the parts used in the disc apparatus, since various changable parts, such as a laser diode, are used in the disc apparatus.

2. Description of the Related Art

FIG. 8 is a perspective view of a stationary type optical disc apparatus known in the prior art, in which a plurality of (e.g., eight) optical disc media 10 are arranged in parallel while spaced equidistantly from each other and supported on a spindle 16, and these optical discs 10 are integrally rotated by, for example, a spindle motor 11.

At the respective sides of the optical disc media 10 are provided optical heads 15, each of which is mounted on a carriage 12 movably mounted on rails 14 on another carriage 13, so that the optical head 15 on the carriage 12 can be moved in the direction of the faces of the optical disc media 10. The carriage 13 is movably mounted on rails 17 arranged in parallel to the spindle shaft 16 of the optical discs 10, and thus all of the parts, including the optical head 15 mounted on the carriage 12, can be moved in parallel to the spindle shaft 16 over the plurality of optical disc media 10.

As mentioned above, the pair of optical heads 15 each including an accessing mechanism have the same structure and are arranged symmetrically at the left and right sides, respectively; one of the optical heads being used as a backup for the other optical head.

When the optical head 15 is to be moved from one of the optical disc medium 10 to another predetermined optical disc medium 10, the optical head 15 is first moved along the rail 14 on the carriage 12, to be retracted from the region of the optical disc media 10, and after having been completely retracted, the carriage 13 is then moved along the rail 17, so that the optical head 15 comes to a position corresponding to the predetermined optical disc medium 10. The optical head 15 is then moved along the rail 14 on the carriage 12 to enter a predetermined position on the surface of the optical disc medium 10.

According to the above-mentioned stationary type optical disc apparatus, when the optical head 15 is to access another optical disc medium 10, the optical head 15 must move not only in the direction parallel to the disc surface, for retracting and entering, but also in the direction parallel to the spindle shaft 16 over the disc media 10. Therefore, according to the above-mentioned optical disc apparatus known in the prior art, the access time for the optical head is increased, and therefore, a high speed processing of the optical disc apparatus cannot be attained.

Also, since various changable parts, such as a laser diode (LD), are used in the stationary type disc apparatus known in the prior art, such parts must be regularly changed, but an easy and rapid replacing, change, or repair of the parts is prevented because the optical head and the accessing mechanism thereof are complicated, as mentioned above.

Particularly, in the known disc apparatus, when the laser diode (LD) is to be changed or repaired, the optical head has to be removed from the optical disc apparatus and the laser diode has also to be removed from the optical head. At the same time, an axis of the optical path of the laser diode and circuit elements for controlling the power of the laser diode have to be regulated. Such regulations take laborious works.

SUMMARY OF THE INVENTION

An object of the present invention is to provide a disc apparatus capable of reducing the access time for the optical head, so that a high speed processing of the optical disc apparatus is attained.

Another object of the present invention is to provide a disc apparatus in which various changable parts, such as a laser diode (LD), can be easily and rapidly changed, replaced, or repaired.

According to the present invention, there is provided a disc apparatus comprising: a housing structure; a plurality of disc media contained in the housing structure and arranged in parallel to and spaced from each other; a plurality of head units each detachably inserted to the housing structure along rails formed in parallel to disc surfaces of the disc media; and a head mounted on each of the head units so that the head is movable in parallel to the disc surface of the disc media, whereby the head can access a predetermined position on the disc media.

In the apparatus according to the present invention, the head unit including the head itself is detachable as a whole from the housing structure. Therefore, for example, when it is necessary to replace the head itself, or a laser diode (LD) used therein is to be replaced, it is only necessary to withdraw the head unit from the housing structure, replace the necessary parts, and again insert the head unit to the housing structure. Accordingly, various changable parts, such as a laser diode (LD), mounted on the head unit can be easily and rapidly changed, replaced, or repaired.

Also, when the head unit is inserted to the housing structure, the head is moved only along the rails of the head unit, in such a manner that the head is moved in the radial direction of the disc media and in parallel thereto, to thereby access a predetermined position of the disc media, and thus the time necessary for an access of the head to the predetermined position of the disc media can be reduced.

BRIEF DESCRIPTION OF THE DRAWINGS

FIG. 5A is a plan view of a head unit; FIG. 5B is a cross-sectional view of the same head unit taken along the line B—B; and FIG. 5C is a cross-sectional view of the same head unit taken along the line C—C;

FIG. 6A is a plan view of an optical head; FIG. 6B is a front view of the same optical head; and FIG. 6C is a cross-sectional view of the same optical head taken along the line C—C;

DESCRIPTION OF THE PREFERRED EMBODIMENTS

Figure 1A:
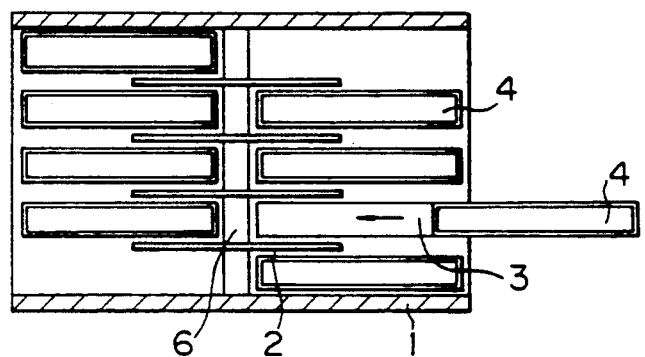
FIG. 1A is a schematic illustration of an optical disc apparatus having four disc media according to the present invention.
Figure 1B:
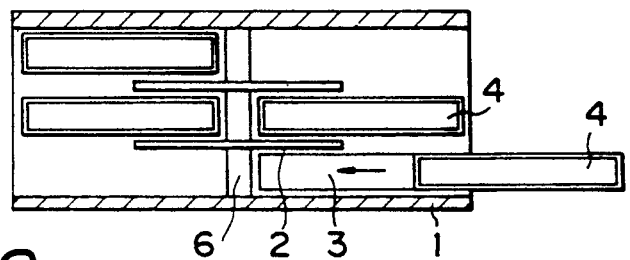
FIG. 1B is a schematic illustration of an optical disc apparatus having two disc media according to the present invention.

Referring now to FIGS. 1A and 1B, an embodiment of an optical disc apparatus of this invention is illustrated. A rectangular box-shaped housing structure 1 contains therein a plurality of optical disc media 2 which are arranged to be spaced in parallel to and equidistantly from each other, and are supported on a spindle 6, whereby these optical discs 2 can be integrally rotated by a known driving means such as a spindle motor. Each of the discs 2 has optical recording surfaces on the respective faces thereof.

The housing structure 1 is provided with groove-like rails 3 extending in parallel to the disc media 2 on the respective sides, in and between the respective disc medias 2. The groove-like rails 3 are also provided above the uppermost disc media at the left hand and below the lowermost disc media at the right hand.

A plurality of head units 4 can be inserted to the housing structure 1 along these groove-like rails 3, and immovably fixed at predetermined insert positions. All of these head units 4 have the same structure and are usually inserted at all of the groove-like rails 3, except that the head units 4 are inserted alternately upward and downward with respect to the left and right sides thereof. Namely, the left uppermost unit 4 acts on the upper surface of the uppermost media 2, the right uppermost unit 4 acts on the lower surface of the uppermost media 2, and so on, whereby both sides of the respective optical disc media 2 are accessed by the head units 4.

Figure 2:
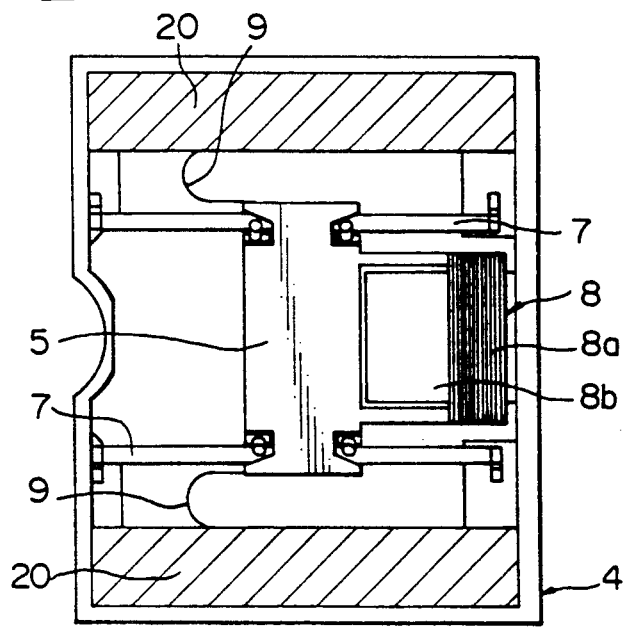
FIG. 2 shows an embodiment of a head unit used in the disc apparatus according to the present invention.

As shown in FIG. 2, the head unit 4 is provided with two parallel rails 7 extending in parallel to the insertion direction of the head unit 4 itself (i.e., in parallel to the direction of the disc media 2) with respect to the housing structure 1. An optical head 5 is moved along the rails 7 to obtain access to a desired position on the disc media 2, and a voice coil motor 8 is mounted on the head unit 4 for moving the optical head 5 along the rails 7. The voice coil motor 8 comprises a coil 8a mounted at the side of the optical head 5 and a magnet 8b mounted on the body of the head unit 4, so that the optical head 5 can be moved by energizing the coil 8a. A pair of printed circuit boards 20 are mounted at the respective sides of the rails of the head unit 4, and a pair of flexible printed circuit sheets 9 are used for connecting the movable optical head 5 to these printed circuit boards 20. As the disc apparatus has the structure as mentioned above, a desired optical head 5 can obtain access to a desired position on the surface of the optical disc media 2. It should be understood that the number of the disc media 2 is not only two or four, as in the illustrated embodiment, but may be eight or more.

Figure 3:
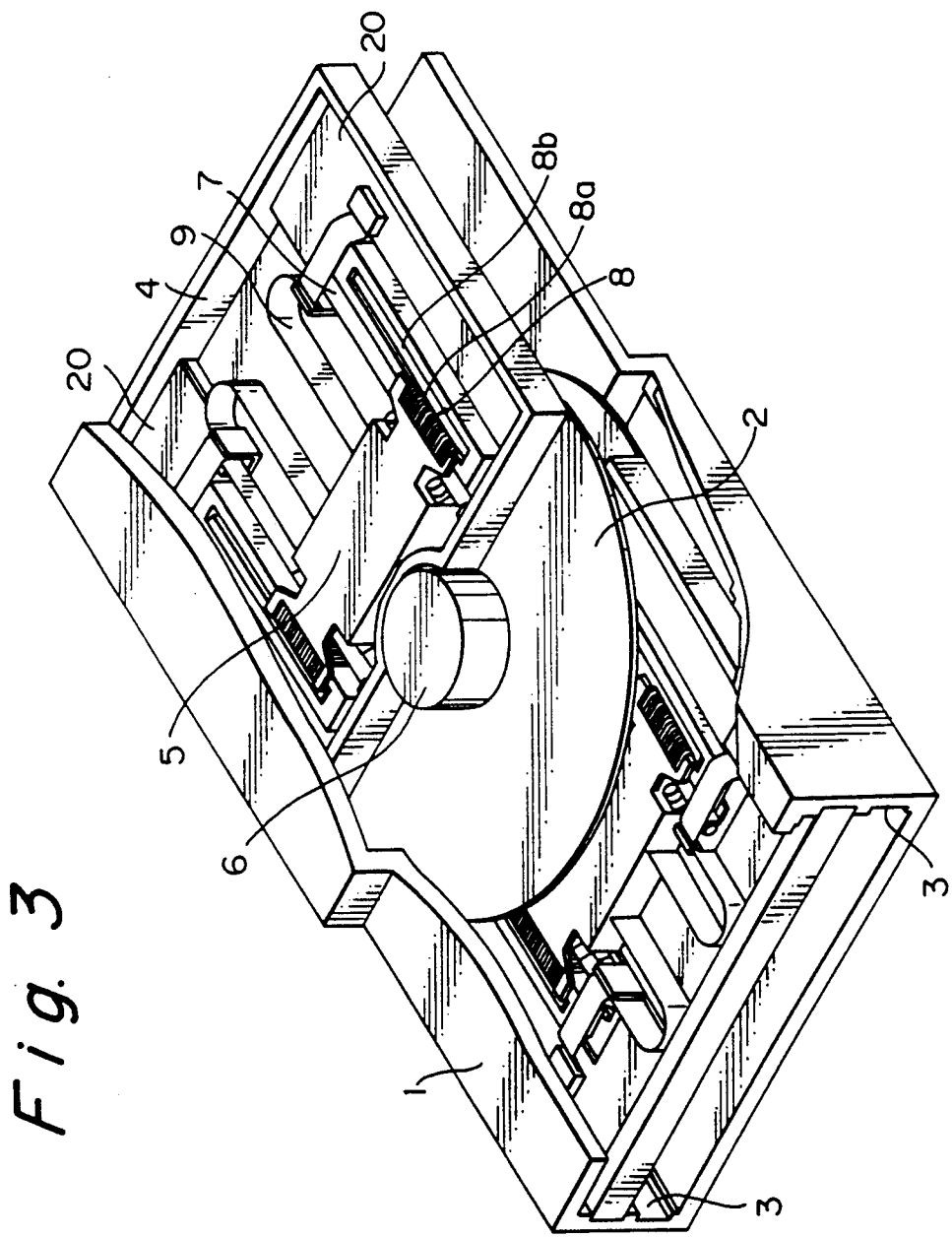
FIG. 3 is a fragmentary perspective view of an embodiment of a stationary type disc apparatus according to the present invention.
Figure 4:
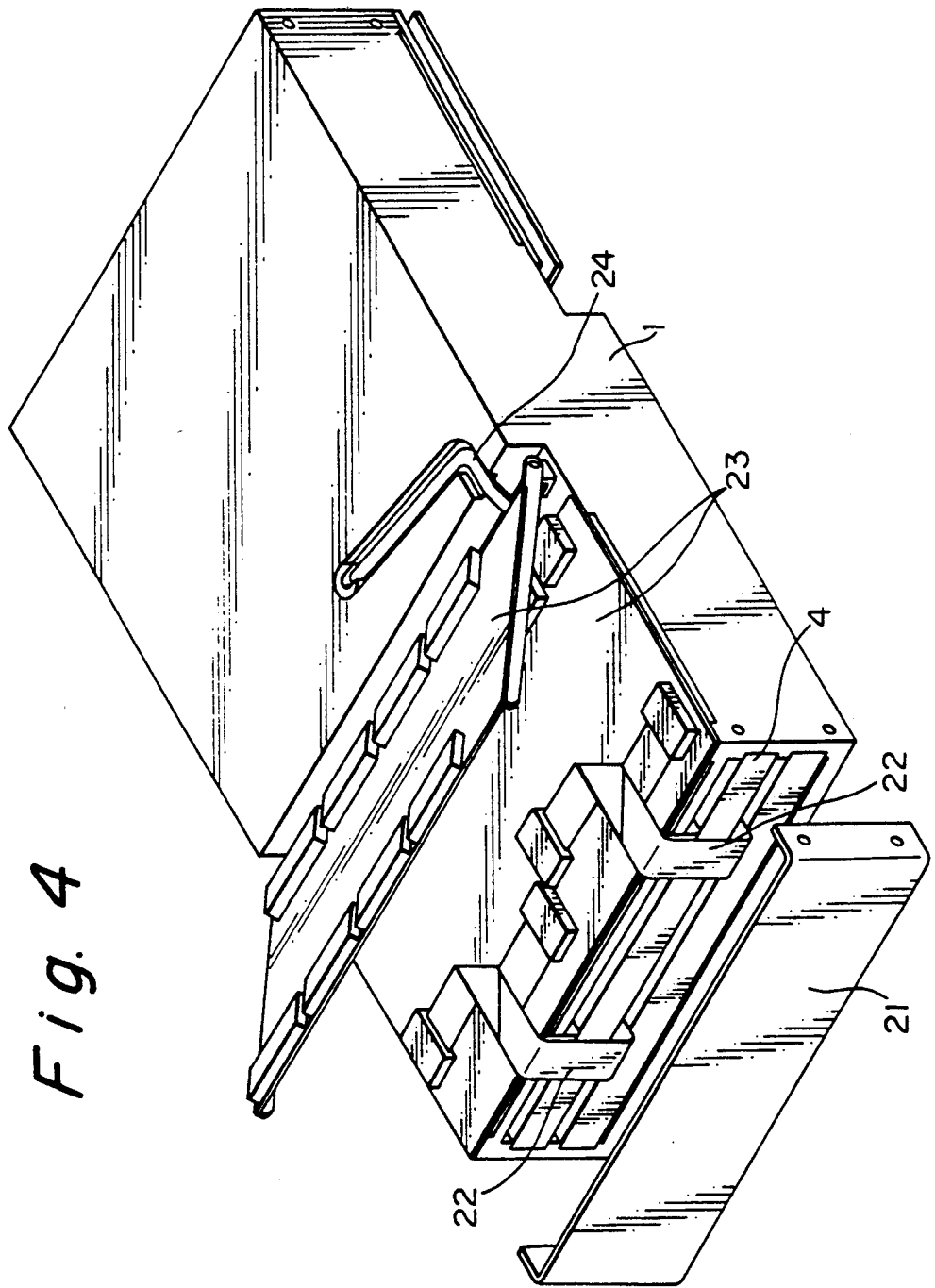
FIG. 4 is a perspective view of a housing structure in the same embodiment as shown in FIG. 3.

FIGS. 3 and 4 illustrate an embodiment of a fixed-type disc apparatus having two disc media according to this invention. In this embodiment, a housing structure 1 contains therein two optical disc media 2 which are arranged and spaced in parallel to each other, and these optical discs 2 are integrally rotated by a spindle motor 6. Each of the head units 4 has a relatively thin thickness and a substantially rectangular in shape, so that the head unit 4 is inserted by its respective side edges into a pair of rails 3 of the housing structure 1.

In this embodiment, as shown in FIG. 3, a voice coil motor 8 comprises a pair of coils 8a mounted at the respective sides of the optical head 5, and a pair of magnets 8b mounted along the rails 7. As shown in FIG. 4, the housing structure 1 comprises a cover 21 for closing the respective end faces of the housing structure 1 after the head units 4 have been installed, flat cables 22 extruding from the respective head units 4, a pair of printed circuit boards 23 mounted on the top of the housing structure 1, one of such circuit boards 23 being fixed and the other being hinged thereto, and a spindle cable 24 for driving the spindle motor 6.

In an embodiment of a stationary type disc apparatus shown in FIGS. 5A, 5B and 5C, the rail 7 has a circular cross-section, and the optical head 5 is provided with pairs of front and rear, and left and right rollers 30, with respect to the moving direction thereof, in contact with the rails 7. As also shown in FIG. 6, these rollers 30 are rotatably mounted on respective shafts directed at the both side edges by 45° with respect to the face of the optical head 5 so that each pair of rollers 30 defines an angle of 90° therebetween for contact with the rail 7. Thus, the rollers 30 are in contact with the rails 7 with a low rolling frictional resistance in such a manner that the position of the optical head 5 (i.e., the position of the optical head 5 in the up and down, left and right direction) can be precisely regulated with respect to the rails 7. A rod-like magnet 8b constituting the voice coil motor 8 is supported by a yoke 31 so as to be in parallel to the rail 7. The yoke 31 comprises a portion for supporting this yoke 31 and another portion extending in parallel thereto so as to penetrate the coil 8a, so that these portions constitute a magnetic field path connected at the respective ends. The coils 8a mounted on the optical head 5 are located at outer sides of the rollers 30 and wound along substantially rectangular cross-sections perpendicular to the moving direction of the optical head 4.

In FIGS. 6A, 6B, and 6C show an optical head used in the embodiment of this invention. In the body of the optical head 5 is provided a laser diode (LD) 41 which is a light source for a semiconductor laser beam. The light beam radiated from the LD 41 is converted to a parallel light beam by a collimeter lens 42 and focused on the surface of the disc media 2 via a lens system 43 and prisms 44 and 45. The light beam reflected from the surface of the disc media 2 is converted to a parallel light beam by an object lens 46 and input, on one hand, via the prisms 44 and 45 and a miller in the lens system 43 to an external monitor 47, and on the other hand, via ¼ wave-length plate 48 to a photosensor 50 by a PBS 49.

Figure 7:
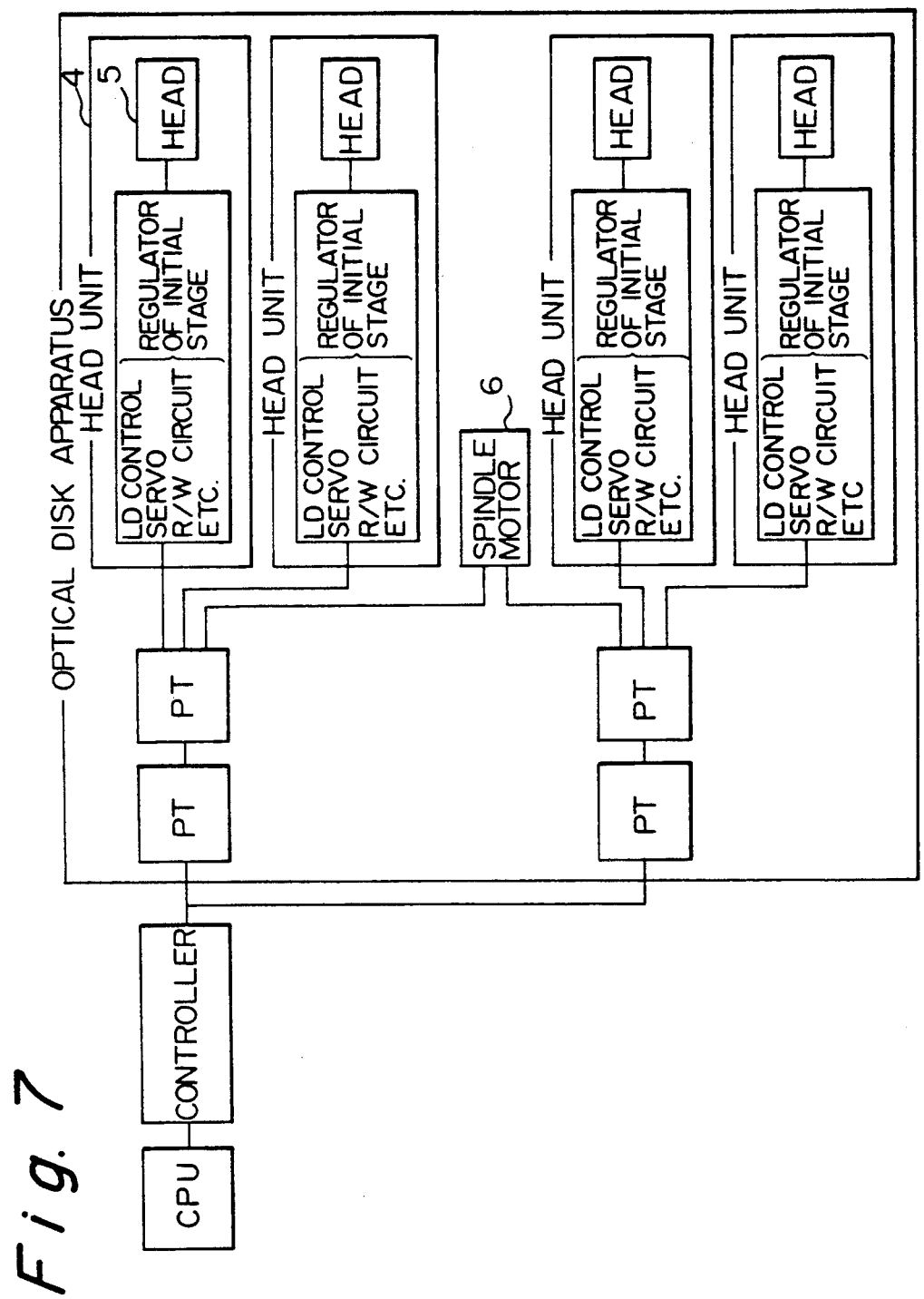
FIG. 7 is a block diagram of a control system in a stationary type disc apparatus according to the present invention; and, FIG. 8 is a perspective view of a stationary type optical disc apparatus known in the prior art.
Figure 8:
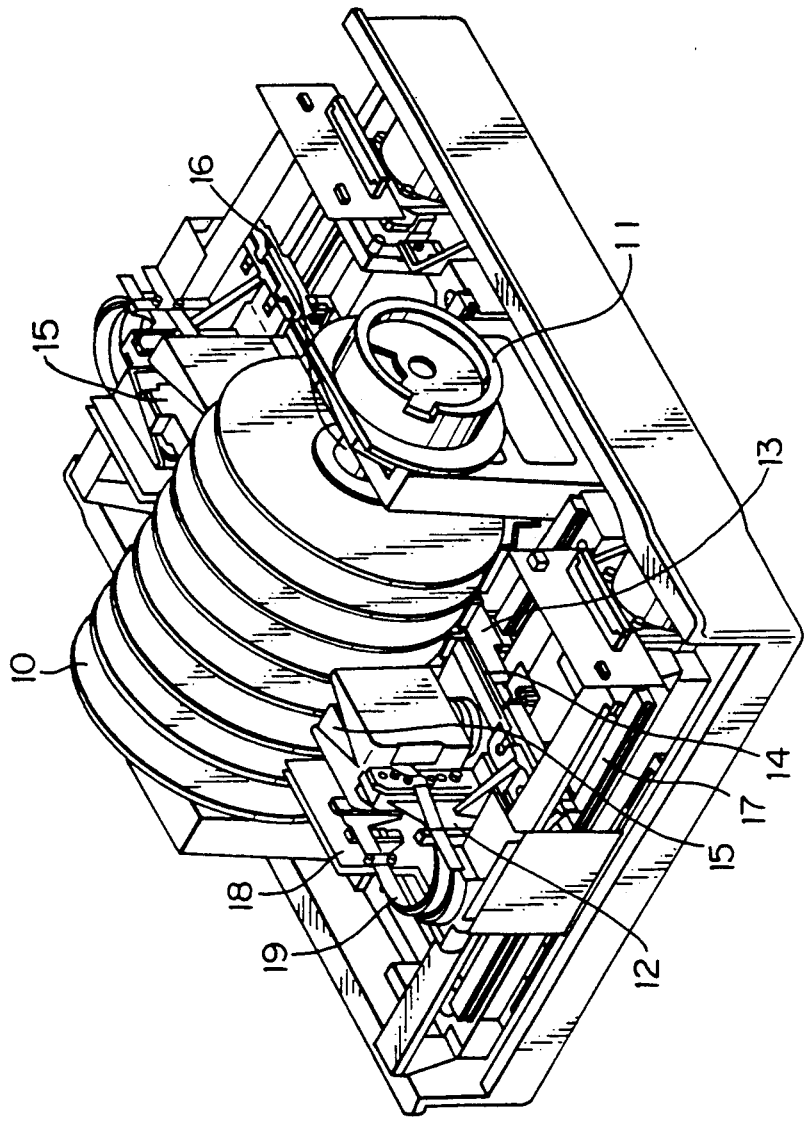

FIG. 7 is a block diagram of a control system of the disc apparatus having two disc media. Each of the respective head units 4 to be applied to the upper and lower surfaces of these two disc media comprises a LD control system of a light source and an initial stage regulator including, for example, an R/W circuit and the like, so that a central processing unit (CPU), a controller, a printed circuit, and so on cooperate to actuate the respective head unit 4.

I claim:

1. An optical disc apparatus comprising:
    a housing structure;
    disc media contained in said housing structure;
    a plurality of head units slidably inserted into said housing structure along groove means formed in parallel to disc surfaces of said disc media, each of said plurality of head units including a semiconductor laser diode, wherein said head units can be completely slidably removed from said housing structure; and
    a head mounted on each of said plurality of head units so that each of said heads is movable within a head unit in parallel to the disc surface of said disc media, whereby each of said heads can access a predetermined position on the disc media,
    wherein said head units are located at opposing sides of a spindle shaft of the disc media, such that both sides of the disc can be read when said head units are inserted into said housing structure.

2. A disc apparatus as set forth in claim 1, wherein said housing structure is shaped as a substantially rectangular box.

3. A disc apparatus as set forth in claim 2, wherein each of said head units is inserted into said housing structure along a pair of parallel grooves formed on respective inner side walls of said housing structure, so that each of said head units are located in a space in said housing structure.

4. A disc apparatus as set forth in claim 1, wherein said head units are applied to the respective disc surfaces of the said disc media.

5. A disc apparatus as set forth in claim 1, wherein said head is movable along a pair of rails provided within said head unit.

6. A disc apparatus as set forth in claim 5, wherein said head is provided with pairs of rollers which are in contact with said rails of said head unit.

7. A disc apparatus as set forth in claim 5, wherein said rail has a circular cross-section, said head is provided with pairs of rollers which cooperate to be in contact with said rails of said head unit, each pair of rollers being freely rotatably mounted on two shafts on the head, and extending at an angle of 45° with respect to a face of rectangular plate-shaped head unit, to thereby define an angle of 90° between said two shafts.

8. A disc apparatus as set forth in claim 1, wherein said head is moved by a voice coil motor comprising a coil mounted on said head and a rod-like magnet mounted on said head unit.

9. A disc apparatus as set forth in claim 1, wherein said head units further comprise therein means for regulating a power to energize said light source.

10. A disc apparatus as set forth in claim 1, wherein said head units further comprise therein optical means, such as a lens systems, prisms, and/or millers.

11. A stationary type optical disc apparatus comprising:
    a housing structure;
    a plurality of disc media contained in said housing structure and arranged in parallel to and spaced from each other;
    a plurality of head units each slidably inserted into said housing structure along groove means formed in parallel to disc surfaces of said disc media, each of said head units including a semiconductor laser diode, wherein said head units can be completely slidably removed from said housing structure; and
    a head mounted on each of said head units so that each of said heads is movable within a head unit in parallel to the disc surface of said disc media, whereby each of said heads can access a predetermined position on the disc media;
    wherein said head units are located at opposing sides of a spindle shaft of the disc media, such that two sides of the disc can be read when said head units are inserted into said housing structure.

12. A disc apparatus as set forth in claim 11, wherein all of said plurality of head units have the same structure and size, and each of said head units is shaped as a rectangular plate.

13. A disc apparatus as set forth in claim 12, wherein said head units are inserted into said housing structure along pairs of parallel rails formed on respective inner side walls of said housing structure, so that said head units are located in spaces defined between the adjacent disc media.

14. A disc apparatus as set forth in claim 11, wherein said head units are applied to the respective disc surfaces of the said disc media.

15. A disc apparatus as set forth in claim 14, wherein said head is movable along a pair of rails provided in said head unit.

16. A disc apparatus as set forth in claim 15, wherein said head is provided with pairs of rollers which are in contact with said rails of said head unit.

17. A disc apparatus as set forth in claim 15, wherein each of said rails has a circular cross-section, said head is provided with pairs of rollers which cooperate to be in contact with said rails of said head unit, each pair of rollers being freely rotatably mounted on two shafts on the head, and extending at an angle of 45° with respect to a face of rectangular plate-shaped head unit, to thereby define an angle of 90° between said two shafts.

* * * * *